(12) United States Patent  
Carson

(10) Patent No.: US 7,779,676 B2  
(45) Date of Patent: Aug. 24, 2010

(54) APPARATUS AND METHOD FOR TESTING OR ISOLATING A PIPE SEGMENT WITH MAGNETICALLY ACTUATED SEALING MEANS

(75) Inventor: Glenn Carson, Point Edward (CA)

(73) Assignee: CAR-BER Investments Inc., Point Edward (CA)

( * ) Notice: Subject to any disclaimer, the term of this patent is extended or adjusted under 35 U.S.C. 154(b) by 0 days.

(21) Appl. No.: 12/101,381

(22) Filed: Apr. 11, 2008

(65) Prior Publication Data

US 2008/0209986 A1 Sep. 4, 2008

Related U.S. Application Data

(63) Continuation of application No. PCT/CA2006/001680, filed on Oct. 13, 2006.

(60) Provisional application No. 60/726,212, filed on Oct. 14, 2005.

(51) Int. Cl.
*G01M 3/28* (2006.01)
*F16L 55/132* (2006.01)

(52) U.S. Cl. .............................. 73/49.5; 73/46; 73/49.1; 138/89; 138/93

(58) Field of Classification Search .................. 73/49.5, 73/37, 46, 49.1; 138/89–97
See application file for complete search history.

(56) References Cited

U.S. PATENT DOCUMENTS

| | | | | |
|---|---|---|---|---|
| 3,495,626 | A | * | 2/1970 | Nagel .......................... 138/97 |
| 4,574,618 | A | | 3/1986 | Anthony et al. |
| 4,753,108 | A | | 6/1988 | Jansch |
| 5,029,614 | A | * | 7/1991 | Lara et al. ...................... 138/90 |
| 5,844,127 | A | | 12/1998 | Berube et al. |
| 6,131,441 | A | | 10/2000 | Berube et al. |
| 6,463,791 | B1 | | 10/2002 | Berube et al. |
| 6,467,336 | B1 | * | 10/2002 | Gotowik ..................... 73/49.8 |
| 6,581,642 | B1 | | 6/2003 | Ritchie et al. |
| 6,601,437 | B2 | | 8/2003 | Gotowik |

* cited by examiner

*Primary Examiner*—Daniel S Larkin
(74) *Attorney, Agent, or Firm*—Santosh K. Chari; Blake, Cassels & Graydon

(57) ABSTRACT

An apparatus for isolating and/or testing a section of a pipe includes a generally annular body having, on each end, a boss. A resilient member such as an O-ring is provided between the annular body and each boss. A series of electromagnets are provided for forcing or urging the bosses towards each other thereby resulting in deformation of the resilient members resulting in a seal being formed between the apparatus and the pipe. A method for isolating and/or testing a pipe segment is also provided.

16 Claims, 4 Drawing Sheets

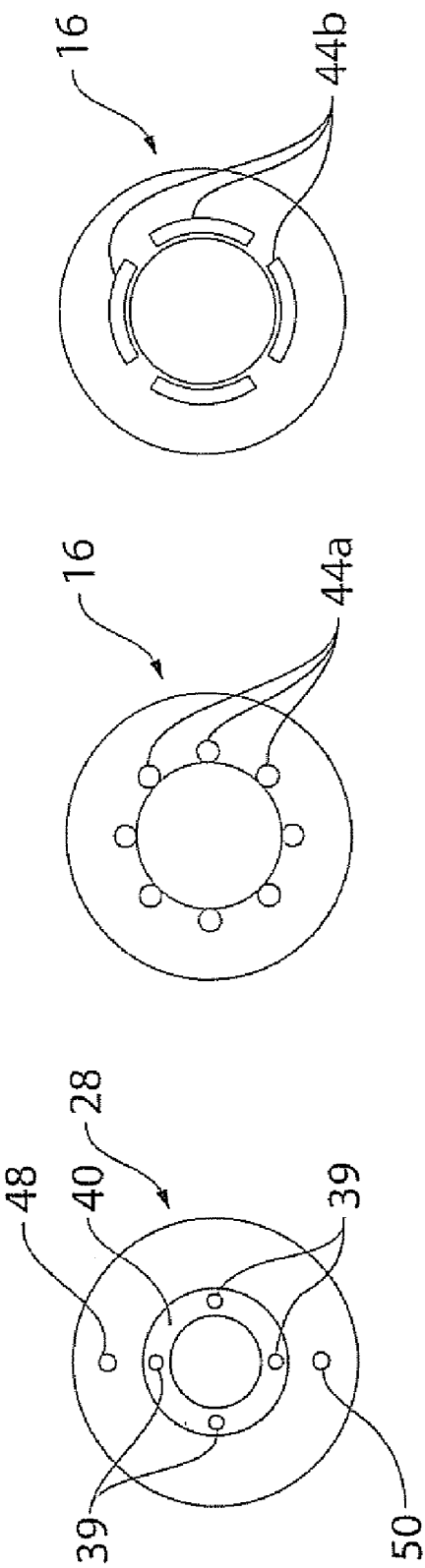

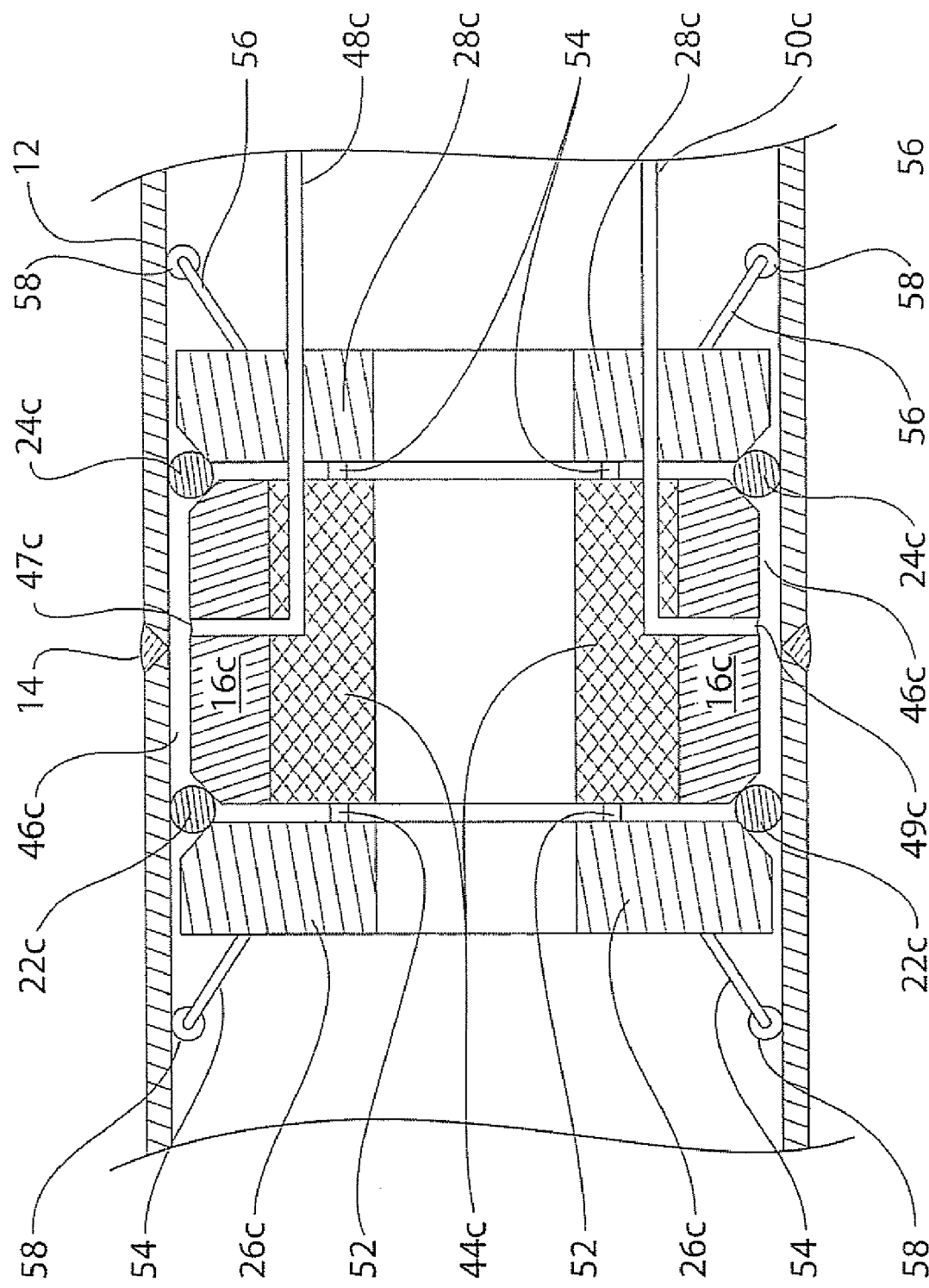

APPARATUS AND METHOD FOR TESTING OR ISOLATING A PIPE SEGMENT WITH MAGNETICALLY ACTUATED SEALING MEANS

CROSS REFERENCE TO PRIOR APPLICATIONS

This application is a Continuation of PCT application number PCT/CA2006/001680 filed Oct. 13, 2006, which claims priority from U.S. Provisional application No. 60/726,212, filed Oct. 14, 2005. The entire contents of all such applications are incorporated herein by reference.

BACKGROUND OF THE INVENTION

1. Field of the Invention

The present invention relates to an apparatus for testing welds on pipes and vessels and the like and, more particularly, an apparatus that internally isolates and tests a section of a pipe using magnetically actuated seals.

2. Description of the Prior Art

In chemical or petrochemical plants etc., it is often necessary to convey fluidic materials (e.g. liquids) from one location to another. The conveyance of such material normally includes equipment such as conduits or pipes, storage or reaction vessels etc., which are generally manufactured from metal. The joining of separate pieces of the conveying equipment is generally achieved by welding the necessary pieces together. For example, when joining adjacent ends of pipe together, it is common for each end to be provided with flanges, that are welded to each respective end, which are then bolted together to form a seal. Such flanges may also be provided on holding tanks and other such vessels so that such vessels can be connected to pipes or other vessels. Alternatively, the connections between lengths of pipe or other equipment may be welded directly together (i.e. butt welded) to form the seal. In either case, it will be appreciated that each welded joint or section must form a complete seal so as to prevent leakage of the materials being transported. This is particularly the case when handling potentially hazardous materials such as flammable or toxic liquids.

For reasons of safety, it is often necessary to periodically test the integrity of the welds used in joining the various pieces of equipment (such as pipes, vessels, flanges and the like) together.

The prior art provides various tools for conducting weld integrity tests on conduits. For example, U.S. Pat. Nos. 6,131,441 and 5,844,127 (the entire disclosures of which are incorporated herein by reference) teach weld testing tools that isolate a particular section of a pipe (such section including a weld) and subject the section to a high pressure fluid within a constrained annular space defined by the tool and the inner surface of the pipe. The pressure of the fluid within the annular space is monitored whereby any pressure drop signifies a leak in the weld.

U.S. Pat. No. 6,463,791 (the entire disclosure of which is incorporated herein by reference) teaches an apparatus for testing welds used to secure nozzles. As shown in FIG. 1 of this reference, the apparatus comprises a first seal plate that is placed on the inner surface of the vessel (for example) and a second seal plate that is secured to the outer, flange portion of the nozzle. In this manner, the nozzle volume is sealed and a pressurizing fluid is introduced therein. Once the volume is filled, the pressure is monitored as above and any leakage detected. Although this apparatus provides an accurate and efficient means of testing welds on nozzles, the size and weight of the apparatus makes it inconvenient for use on large nozzles.

Further, applicant's co-pending U.S. applications, Ser. Nos. 60/640,093 and 60/663,871 (the entire disclosures of which are incorporated herein by reference), provide tools for testing the integrity of welds on pipes and the like.

There exists a need for a pipe or weld testing tool that can efficiently seal a section of a pipe for conducting the type of stress tests mentioned above.

SUMMARY OF THE INVENTION

In one aspect, the present invention generally provides an apparatus for internally sealing a section of a pipe wherein an integrity test of a weld can be conducted.

In a further aspect, the invention provides an apparatus that is capable of conducting a stress test on a weld while simultaneously sealing the section to be tested.

In yet a further aspect, the invention provides an apparatus that is capable of isolating a section of a pipe from the remainder of the pipe.

In one embodiment, the invention provides an apparatus for insertion within a pipe, the apparatus comprising:

an annular body having an outer diameter;

first and second bosses provided on each end of the annular body;

first and second resilient members provided, respectively, between the first and second bosses and the annular body;

the apparatus including one or more electromagnets for forcing the first and second bosses axially towards each other.

In another embodiment, the invention provide an apparatus for insertion within a pipe, the apparatus comprising:

a body having an outer diameter and being adapted for insertion within the pipe;

first and second bosses provided on each end of the body, the bosses also being adapted for insertion within the pipe;

first and second resilient members provided, respectively, between the first and second bosses and the body;

the apparatus including one or more electromagnets, connected to a power source, for forcing the first and second bosses axially towards each other.

In a further embodiment, the invention provides a method of isolating or testing a pipe segment comprising:

inserting a body within the pipe, the body having an outer diameter less than the inner diameter of the pipe for forming an annular space between the body and the pipe inner wall;

forming a circumferential seal on each end of the body, the seals being formed against the inner wall of the pipe, for forming a sealed annular space bounded by the seals, the outer surface of the body, and the inner wall of the pipe;

filling and pressurizing the annular space with a fluid.

BRIEF DESCRIPTION OF THE DRAWINGS

These and other features of the invention will become more apparent in the following detailed description in which reference is made to the appended drawings wherein:

FIG. 3 is a front view of the second boss of the apparatus of FIG. 1.

FIGS. 4 and 5 are end views of the annular body of FIG. 1 showing different magnet arrangements.

FIG. 6 is a cross sectional view of another embodiment of the apparatus of the invention.

DETAILED DESCRIPTION OF THE INVENTION

Figure 1:
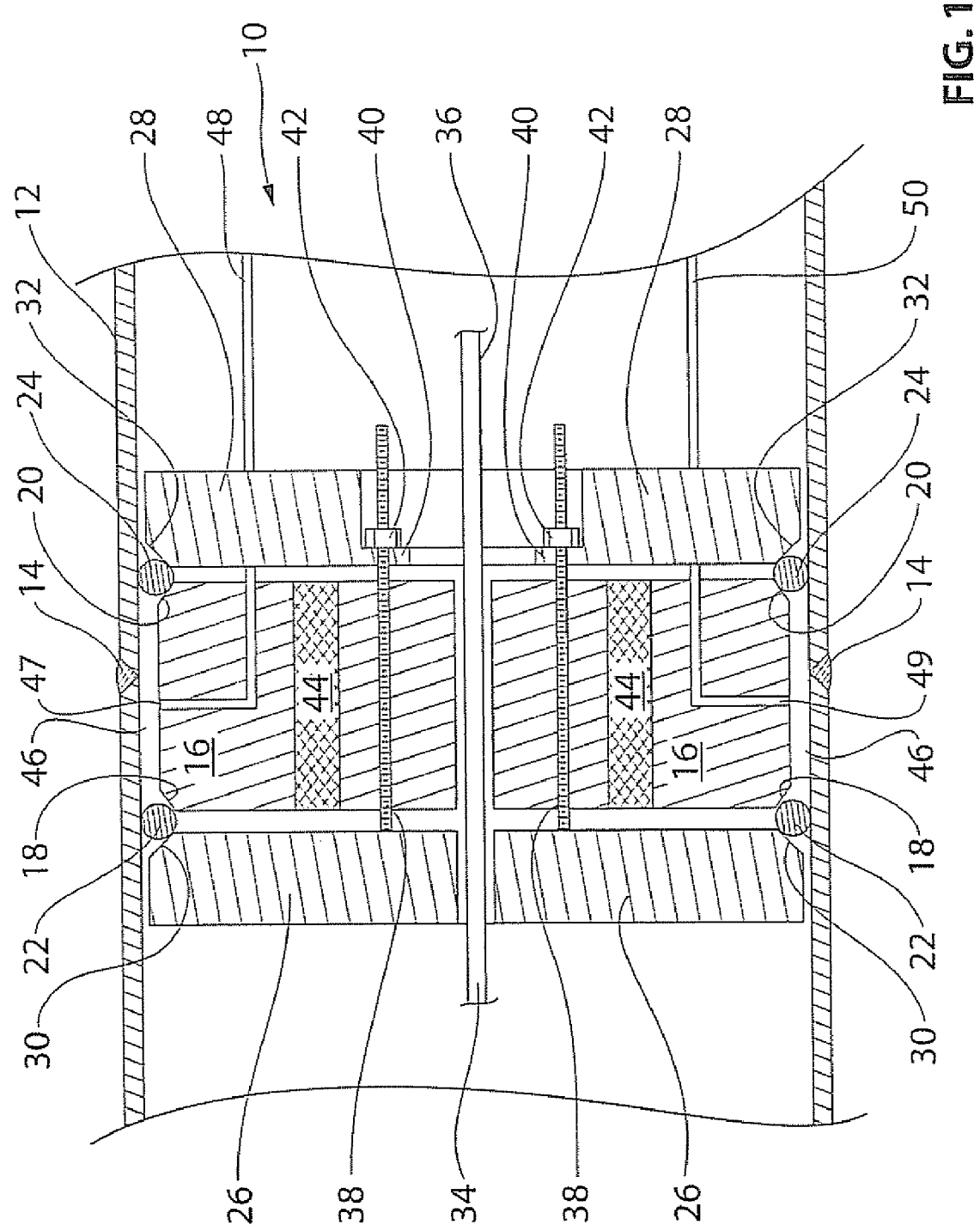
FIG. 1 is a cross sectional view of one embodiment of the apparatus of the present invention in position within a pipe.

Throughout the description of the invention the following terms will be assumed to have the following associated meanings:

"Vessel"—will be understood to mean any equipment or apparatus to which a nozzle is attached. As such, the term "vessel" will include vessels per se, pipes, drums, and any other similar equipment. It will be understood that the term "vessel" is used herein simply as a convenient way to encompass all such equipment or apparatus.

"Annular"—this term is used to describe a body having at least one outer diameter and at least one inner diameter. Thus, an "annular tube" will be assumed to be a hollow tube with an inner and outer diameter. An "annular disc" will be assumed to be an object having an outer diameter and a central aperture thereby providing an inner diameter.

"Axial"—this term will be used to describe a direction taken along the longitudinal axis of a pipe or conduit. Thus, "axial force" or "axial stress" will be understood as being a force applied in a direction parallel to the longitudinal axis of the conduit.

As mentioned above, applicant's prior U.S. Pat. Nos. 6,131,441 and 5,844,127 relate to isolation and testing tools for pipes and the like. The tools or apparatus taught in these references are designed for insertion within a pipe and for positioning at a region to be tested or isolated. The tools include a generally annular body having an outer diameter that is less than the inner diameter of the pipe so that, when the body is inserted within a pipe, a generally annular space is created between such body and the pipe inner wall. The tool also includes two bosses wherein one boss is positioned on each end of the annular body and designed for insertion within the pipe. The annular body is separated from each boss by a resilient sealing member such as an O-ring and the like. A screw mechanism, or other similar means as will be known to persons skilled in the art, is provided for forcing the bosses towards each other and thereby against each end of the annular body. In the result, the resilient members are deformed and forced radially outward against the inner wall of the pipe. Sufficient force is applied to the bosses so as to ensure that the resilient members are forced against the inner wall of the pipe to form a liquid and pressure tight seal with the pipe. The annular space created between the apparatus and the pipe inner wall can then be pressurized to carry out the required pressure test. It will also be understood that such tool can serve to isolate a section of the pipe and not conduct any test. In the latter case, the tool may be positioned anywhere along the length of the pipe and not necessarily near any weld. It will also be understood that during the testing and/or isolation step, a fluid of a desired temperature can be circulated through the annular space so as to maintain that section of the pipe at a constant temperature. The force applied to bring the bosses together is provided by means of a single bolt or a plurality of circumferentially spaced bolts that extend through both bosses and that are secured by cooperating nuts. The present invention provides an improvement over these known tools by including a magnetic means for forcing the bosses together. As will be understood, such a magnetic means can be used to apply the required sealing force over the desired circumferential region in an even and uniform manner.

FIG. 1 illustrates an embodiment of the present invention, which comprises a tool or apparatus 10 that is adapted for insertion within a pipe 12. The pipe 12 can generally be of any diameter and would, in the usual case, be made of a metal and, when an integrity test is conducted, may include at least one circumferential weld 14 along its length. Such weld 14 would be used for example to join two lengths of pipe together or to join a length of pipe to another pipe-like extension (for example, the stem portion of a nozzle or a flange etc.) The tool 10 would be used, in one embodiment, to test the integrity of the weld 14. Alternatively, the tool can be used to isolate a section of the pipe as will be understood by persons skilled in the art.

The tool 10 preferably includes a generally annular body 16 having an outer diameter that is smaller than the inner diameter of the pipe 12. Preferably the outer diameter of the tool is only slightly smaller than the inner diameter of the pipe, as will be appreciated by persons skilled in the art having reference to the present disclosure. The body 16 can be provided with any desirable inner diameter or may, in other embodiment, assume a solid shape. That is, the body 16 may comprise a generally cylindrical shape instead of having an annular shape. However, for the purpose of weight reduction, an annular shape is preferred. For the balance of the present disclosure, the term "annular body" will be understood for convenience but it will be understood that such term is not meant to limit the shape of the body 16 to any particular shape. In addition, when a weld test is being conducted, it may be preferred to have an annular shape for the body 16 so as to allow communication between opposite sides of the tool and, in the result, prevent any buildup of pressure (resulting from residual vapours) in the pipe. In the case where the tool is used to isolate a section of the pipe, it will be understood that a solid (i.e. cylindrical) shaped body 16 may be used.

In a preferred embodiment, the body 16 includes beveled edges 18 and 20 along the circumference of each end, which assist in receiving and/or retaining first and second resilient members 22 and 24, respectively. The resilient members may comprise, for example, O-rings. The resilient members 22 and 24 are made of a material that is elastically deformable upon the application of a force. In another embodiment, the body 16 can be provided without the aforementioned bevels. It will be understood that the bevels, 18 and 20, provide a simple way to retain the resilient members, 22 and 24, in the desired position. It will also be understood that by providing the bevels in sloping arrangement away from the wall of the pipe, the deformation of the resilient members is directed radially outward against the pipe inner wall.

The tool 10 also includes first and second bosses 26 and 28, respectively, provided on opposite sides of the annular body 16. The bosses 26 and 28 are also generally annularly shaped and have an outer diameter that is sized to fit into the pipe 12. The sides of the bosses 26 and 28 facing the annular body 16 are each preferably provided with a bevel, 30 and 32, respectively, to cooperate with the bevels 18 and 20 of the body 16 so as to form a recess for receiving and directionally deforming the resilient members 22 and 24. In this regard, as illustrated in the accompanying figures, the bevels 30, 32 are preferably oppositely directed as compared to the bevels 18, 20. It will be understood that the bevels 30 and 32 are optional for the reasons discussed above. It will also be understood that the desired results may be achieved with providing bevels on the ends of the annular body 16 or one each of the bosses 26 and 28, with the oppositely facing element being flat.

The first boss 26 preferably comprises a generally annular plate having a central aperture 34. In one embodiment, a pipe or conduit 36 may be provided on the aperture 34 to provide a fluid or gas communication means through the pipe 12 between opposite sides of the tool 10. As discussed above, such aperture may be omitted if the tool is used to isolate a section of pipe. However, it will be understood that even with such isolation, the communication achieved by the aperture 34 may sometimes be needed to prevent the aforementioned pressure buildup.

The first boss 26 is also provided with at least two, and preferably a plurality, of circumferentially spaced bolts 38 extending towards the second boss 28. One end of the bolts 38 may be welded to the first boss 26 or secured thereto by nuts and the like. Various other means to secure the bolts 38 to the first boss 26 will be known to persons skilled in the art. The bolts 38 extend through holes 39 (shown in FIG. 3) provided in a flange 40 extending radially inward from the second boss 28. In one embodiment, the flange 40 may be avoided by decreasing the inner diameter of the second boss, i.e. by having it assume a generally annular plate-like structure similar to the first boss 26. However, it will be understood that using a flange 40 as shown in FIG. 1 will decrease the weight of the second boss 28. In a further aspect, the flange 40 can be replaced with radially inwardly extending arms to further reduce the weight of the second boss 28. The purpose of the flange 40 or any equivalent thereof is to provide an anchoring means to secure the second boss 28 to the first boss 26 via the bolts 38. It will also be understood that although the above description refers to the first boss 26 being provided with the bolts 38, these may equally be provided on the second boss 28 in which case the bolts 38 will extend from the second boss through holes in the first boss and secured to the latter with nuts 42 as shown in FIG. 1. To accomplish this, it will be understood that at least the terminal ends of the bolts 38 (i.e. the end proximal to the second boss when extending from the first boss) are provided with a threaded outer surface so as to engage cooperatively threaded nuts 42.

The second boss 28 is positioned to engage the bolts 38 and the second boss 28 is maintained in position and initially brought towards the first boss 26 by means of nuts 42. In order to provide further force to bring the bosses 26 and 28 towards each other, electromagnets 44 are provided on the annular body 16. The magnets 44 are circumferentially spaced so as to provide an even attraction force to both bosses 26 and 28. It will be appreciated that any number of magnets 44 can be provide and such number will depend in one aspect on their shape. That is, if the magnets are of small cross sectional area, the number required will be greater. However, if the magnets have a larger cross sectional area, which may require them to be curved in shape, fewer would be required. By way of example, FIGS. 4 and 5 illustrate different arrangements of the magnets 44a and 44b, respectively, on the annular body 16. Any conventional power supply (not shown) may be used to power the electromagnets 44.

Figure 2:
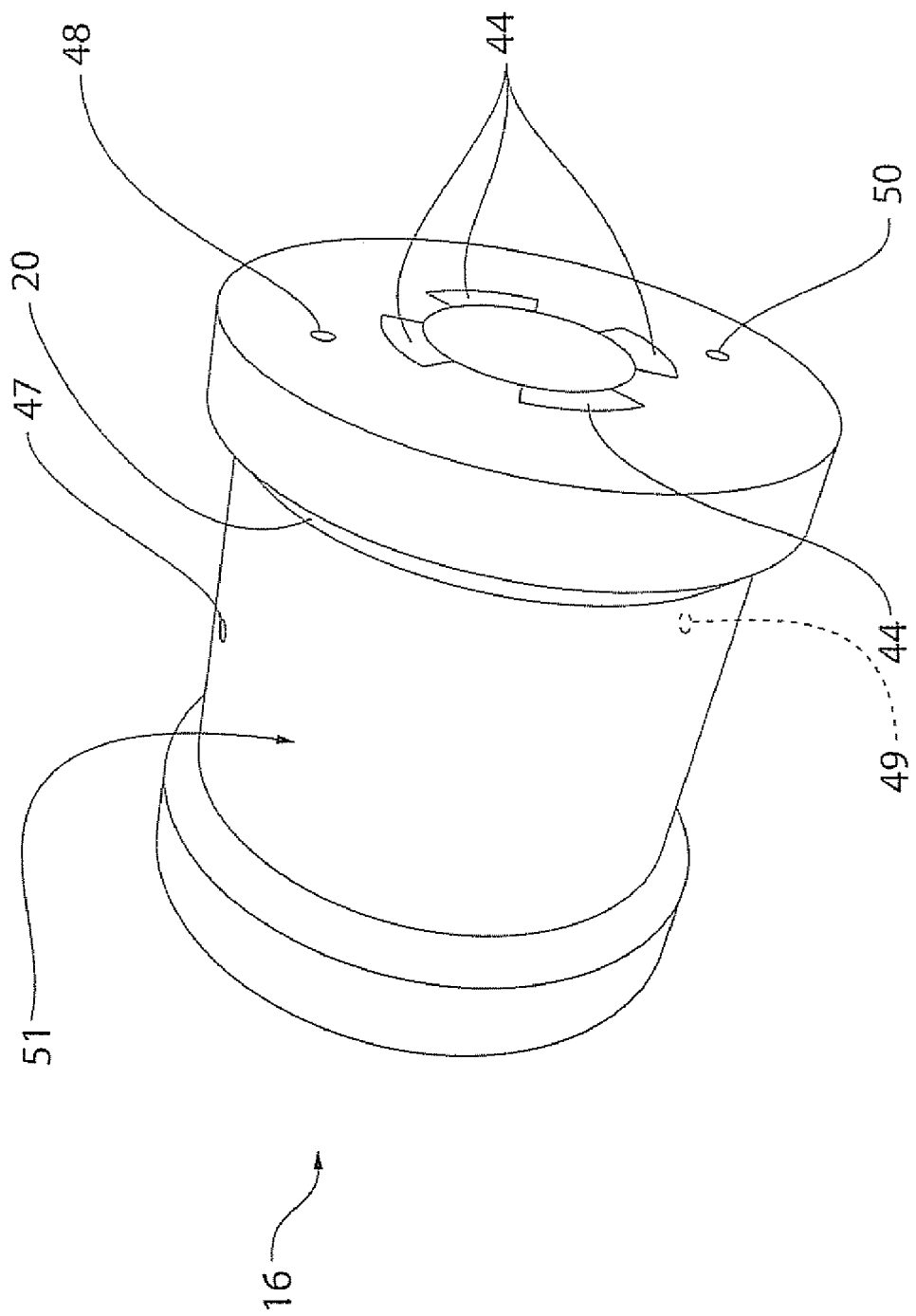
FIG. 2 is a perspective view of the annular body of FIG. 1.

As shown in FIG. 1, once the apparatus 10 is positioned and assembled, an annular space 46 is formed between the annular body 16, the pipe inner wall, and the resilient members 22 and 24. In one embodiment, the annular body 16 may be provided with a recess 51 (as shown in FIG. 2) on its outer diameter so as to increase the clearance of the annular space 46. At least one port is provided in the annular body to fill the annular space 46 with a fluid. In a preferred embodiment, as shown in FIG. 1, the outer diameter of the annular body 16 is provided with at least two openings 49 and 47 connected, respectively, to inlet and outlet ports 50 and 48. By providing two ports, it will be understood that one of such ports can function as a fill port while the other serves to vent any gas contained in the annular space 46. In a further preferred embodiment, the filling port 50 is provided circumferentially below the vent port 48 in order to accommodate the rising of air trapped within the annular space 46. As shown in FIG. 1, the ports 48 and 50 extend through one of the bosses 26 or 28 and are connected to appropriate equipment as known in the art and as described in the aforementioned US patents. In the embodiment shown in FIG. 1, the ports 48 and 50 extend through the second boss 28; however, they may equally extend through the first boss 26 instead.

In operation, the apparatus 10 may first be assembled loosely and inserted into the pipe 12. It will be understood that the various elements of the apparatus 10 should not be tightened since doing so will deform the resilient members 22 and 24 in a radially outward direction, thereby preventing insertion into the pipe 12. Once the apparatus 10 is pushed to the desired location along the length of the pipe 12, such as at the location of a weld 14 to be tested, the nuts 42 are tightened to as to pre-stress the tool. Once the apparatus is in position, power is supplied to the electromagnets 44 and a strong attraction force is created to draw the bosses 26 and 28 together. Such force causes the bosses to bear against the resilient members 22 and 24 thereby resulting in elastic deformation of same. The bevels on the bosses and/or annular body 16 assist in forcing the resilient members 22 and 24 radially outward against the inner wall of the pipe 12. This creates two firm circumferential seals on each end of the annular body 16 and creates the sealed annular space 46. At this point, a pressurized fluid may be introduced into filling port 50 and any air trapped within the annular space 46 is vented through vent port 48. Once all air is removed from the annular space 46, the space is pressurized with the fluid to a desired value.

If the tool is used to conduct an integrity test on a weld 14, the pressure within the annular space 46 is increased by means of a pressurized fluid and monitored for a specified period of time. Any drop in pressure would signify a leak in the weld 14.

In another embodiment the apparatus 10 of the invention can be used to isolate a section of a pipe 12. In this case, the apparatus 10 is pushed to a desired location, not necessarily including a weld, and the above mentioned seals established. Once the annular space 46 is vented, a fluid of a constant temperature can be circulated through the space 46 so as to maintain that section of the pipe 12 at a constant temperature. In this way, various operations such as welding etc. can be carried out on one section of the pipe without affecting the section of the pipe on the opposite side of the apparatus 10. This feature is particularly useful where a welding or cutting operation needs to be performed on a pipe that normally carries flammable materials and there is a possibility of such vapours being present even if flow to the pipe is stopped.

FIG. 2 shows one embodiment of the annular body 16 of FIG. 1. The magnets 44 shown in FIG. 2 comprise one embodiment wherein four elongate magnets are provided in a circumferentially spaced orientation. As discussed herein, various other types of magnets and orientations thereof are possible. FIG. 2 also illustrates the optional recess 51 formed on the outer diameter of the annular body 16 in order to increase the volume of the annular space 46 when the apparatus is installed within a pipe.

FIG. 3 illustrates the second boss 28 of FIG. 1. As shown, the boss is provided with a number (at least two) of holes 39 through which are passed the bolts 38 extending from the first boss 26. For the sake of convenience, the boss 28 is shown as having four circumferentially spaced holes 39.

FIG. 6 illustrates another embodiment of the invention where like elements are referred to with like reference numerals but with the letter "c" added for clarity. As shown, the apparatus 10c includes an annular body 16c and bosses 26c and 28c on opposite ends thereof. The bosses are maintained in position by means of connectors 52 and 54, which connect, respectively, the bosses 26c and 28c to the annular body 16c and maintain the bosses in a spaced arrangement wherein the resilient members 22c and 24c are not deformed. As will be understood, the connectors 52 and 54 allow limited relative axial movement between the bosses. The annular body 16c is provided with a series of electromagnets 44c that, when activated or powered, serve to force the bosses 26c and 28c together to create the seal as discussed above. As described above, the apparatus 10c is preferably provided with vent and fill ports 48c and 50c, respectively, to fill and/or pressurize the annular space 46c.

With the embodiment of FIG. 6, it is also seen that the bosses 26c and 28c may optionally include wheel and frame assemblies including outwardly extending arms 54 and 56, respectively, each extending towards the inner wall of the pipe 12. The arms 54 and 56 each terminate with one or more wheels or rollers 58. With this arrangement, it will be appreciated that the apparatus 10c can be easily moved to a desired location (such as the location of a weld 14) and put into a sealing arrangement upon activation of the electromagnets 44c. Once the test is completed, the magnets are disengaged and the resiliency of the members 22c and 24c would serve to force apart the bosses 26c and 28c. In order to assist this separation, the connectors 52 and 54 may be provided with springs or other such resilient members to apply a further separation force against the bosses.

It will be appreciated that a plurality of arms 54 and 56 may be provided, each set being circumferentially spaced so as to facilitate the movement of the apparatus 10c within the pipe. Further, each arm may be provided with a spring-like shock absorber etc. to further facilitate passage of the apparatus through the pipe. In a further embodiment, the apparatus 10c of FIG. 6 may be motorized so that it may be controlled remotely and moved through the pipe 12.

In the above description, the magnets for forcing the bosses together have been indicated as being provided on the annular body. However, it will be understood that such magnets can equally be provided on one of the bosses and serve to force the opposite boss towards the other. In such case, the magnets may be permanently attached to one of the bosses.

It will be understood that the above discussion has used geometric terms such as annular, disc, circumference, etc., for ease of reference. However, these terms should not be construed as limiting the invention to any specific shape of nozzle or pipe and various modifications of the apparatus will be apparent to persons skilled in the art to adapt same to any shape or design.

Although the invention has been described with reference to certain specific embodiments, various modifications thereof will be apparent to those skilled in the art without departing from the spirit and scope of the invention as outlined in the claims appended hereto. The disclosures of all prior art recited above are incorporated herein by reference in their entirety.

I claim:

1. An apparatus for insertion within a pipe, said apparatus comprising:
   a body having an outer diameter and being adapted for insertion within the pipe;
   first and second bosses, each provided against an opposite end of the body, said bosses also being adapted for insertion within the pipe;
   first and second resilient members provided, respectively, between said first and second bosses and said body;
   said apparatus including one or more electromagnets, connected to a power source, for magnetically attracting and forcing said first and second bosses axially against the respective ends the body.

2. The apparatus of claim 1 wherein said body has a generally annular shape.

3. The apparatus of claim 1 wherein said magnets are provided on each end of said body.

4. The apparatus of claim 3 wherein said magnets are circumferentially equidistantly spaced along the surface of said ends of the body.

5. The apparatus of claim 1 wherein said bosses are provided with a mechanical means for drawing said bosses towards each other.

6. The apparatus of claim 5 wherein said mechanical means comprises one or more bolts extending through said bosses.

7. The apparatus of claim 6 wherein a plurality of bolts are provided and wherein said bolts are circumferentially equidistantly spaced along the faces of the bosses.

8. The apparatus of claim 1 wherein the resilient members comprise O-rings.

9. The apparatus of claim 1 wherein opposing faces of at least one of the first and second bosses and the ends of the body are provided with beveled out edges for receiving the resilient members.

10. The apparatus of claim 1 wherein the body includes at least one port for allowing passage of a fluid into a space formed by the body, the resilient members and the pipe, when said apparatus is in use.

11. The apparatus of claim 1 further including a channel extending axially therethrough.

12. A method of isolating or testing a pipe segment comprising:
   inserting a body within the pipe, said body having an outer diameter less than the inner diameter of the pipe for forming an annular space between the body and the pipe inner wall;
   forming a circumferential seal on each end of said body, the seals being formed against the inner wall of the pipe, for forming a sealed annular space bounded by the seals, the outer surface of the body, and the inner wall of the pipe;
   filling and pressurizing the annular space with a fluid;
   wherein said circumferential seals are provided by radially outward deformation of resilient sealing members, said deformation being provided by forcing said members against the ends of body by drawing together bosses on opposite ends of the body and wherein said bosses are drawn together by magnetic attraction.

13. The method of claim 12 further comprising monitoring the pressure within the annular space.

14. The method of claim 12 wherein said fluid is circulated through the annular space for maintaining the portion of the pipe adjacent the annular space at a desired temperature.

15. The method of claim 12 further comprising establishing a channel through the body whereby fluid communication is provided within the pipe on opposite ends of the body.

16. The method of claim 12 further comprising pre-stressing the apparatus by drawing the bosses together with mechanical means prior to commencing said magnetic attraction.

* * * * *